Sept. 18, 1962   B. S. STRATFORD   3,054,255
FLUID INTAKE FOR SUPERSONIC FLOW
Filed Sept. 4, 1959   3 Sheets-Sheet 1

*Inventor*
BRIAN STAPLETON STRATFORD
By
Larson and Taylor  *Attorney*

Sept. 18, 1962   B. S. STRATFORD   3,054,255
FLUID INTAKE FOR SUPERSONIC FLOW
Filed Sept. 4, 1959   3 Sheets-Sheet 2

Inventor
BRIAN STAPLETON STRATFORD
By
Attorney

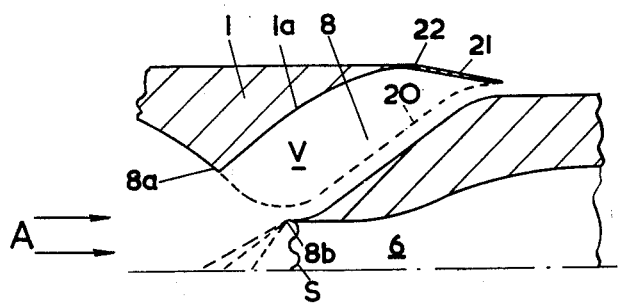
FIG. 5
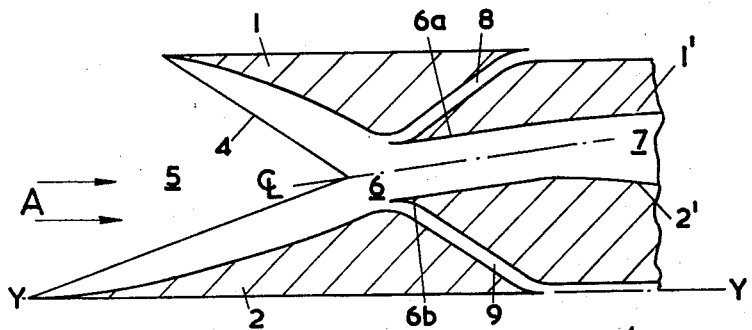
FIG. 6
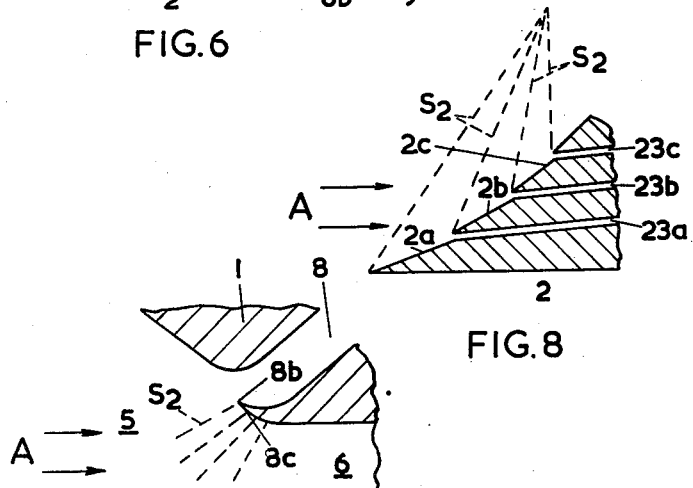
FIG. 7
FIG. 8

United States Patent Office

3,054,255
Patented Sept. 18, 1962

3,054,255
FLUID INTAKE FOR SUPERSONIC FLOW
Brian Stapleton Stratford, Farnborough, England, assignor to Power Jets (Research and Development) Limited, London, England, a British company
Filed Sept. 4, 1959, Ser. No. 838,078
Claims priority, application Great Britain Sept. 10, 1958
8 Claims. (Cl. 60—35.6)

This invention relates to fluid intakes for operation under supersonic flow conditions, such as may occur at the air intakes in a wing and/or engine and/or fuselage of aircraft and of airborne missiles designed for flight at supersonic speeds. Such intakes may serve wholly or in part to supply air to a propulsion unit and may find application as an intake for aircraft operating on the Busemann biplane principle or on a modified Busemann biplane principle by which the internal flow is diffused to subsonic speed before being reaccelerated through a supersonic nozzle. When air is delivered towards the intake at supersonic velocity the leading edge of the intake gives rise to a shock wave which represents an energy loss, commonly termed wave drag, and one of the measures which has been preposed to minimise this loss is to provide an intake of convergent divergent configuration designed to accept substantially parallel flow at its leading edges, followed by a convergent portion leading successively to a throat and then to a divergent portion. The latter portion which acts as a subsonic diffuser directs the air towards the propulsion unit. The propulsion unit may suitably be a gas turbine jet propulsion engine, a ram jet engine, or other supersonic propulsion unit.

Under operating conditions, air at supersonic velocity entering the convergent portion is decelerated with consequent pressure rise and a normal shock wave is established at the throat or slightly downstream thereof, and the air at subsonic velocity is diffused in the divergent portion. Air impingement upon the converging walls gives rise to a series of compression waves which are, by virtue of the geometry of convergent walls of existing convergent-divergent intakes, directed towards the opposite face of the convergent portion from which the waves may be reflected obliquely towards the throat portion. Simultaneously with the formation and reflection of these compression waves, a boundary layer flow occurs along the convergent wall surfaces and hence the boundary layer passes through a series of compression waves representing a successive number of supersonic pressure rises. As has already been proposed, the boundary layer flow may be removed from the main flow by suitable bleed apertures.

Pressure rise in the convergent portion of the intake is therefore accompanied by losses resulting from considerable growth or thickness increase of the boundary layer on the convergent compression surfaces. The compresson waves may pass through the boundary layer flow at a number of points along the convergent walls and hence losses may be experienced due to shock loss and to the possibility of boundary layer separation when the compression waves pass through the boundary layer.

The present invention aims to improve the aerodynamic efficiency of intakes of the convergent divergent type by minimising losses which may result in the manner mentioned above.

To this end, the present invention provides an air intake for receiving flow at supersonic velocities having a convergent passage, a throat portion and a divergent passage arranged successively in the direction of flow and a bleed aperture formed in the wall of the convergent passage adjacent the throat portion, the geometry of the walls of the convergent portion being so related to the position of the bleed aperture that compression waves, arising from impingement of air on the walls of the convergent passage, are directed towards a focal region adjacent the aperture.

In most cases it is preferable to arrange for the surfaces downstream of the lip to give substantially parallel flow thereby ensuring that there will be no significant reflection of the compression waves from these surfaces.

Thus the geometry of the convergent walls is such as to cause all compression waves which arise from initial impingement on the converging walls to cross the flow once only, this occurring in the convergent portion of the intake and to be focused at a region of the duct where zero or minimum boundary layer flow occurs.

This arrangement minimises the length of the converging walls (and hence it minimises the growth in thickness of the boundary layer). It also reduces the interference between the compression waves and the boundary layers.

Thus the invention provides a configuration of the profiled faces of the convergent walls of the intake, which configuration is so related to the position of the inlet of the boundary layer bleed passage located at the region upstream of the throat as to result in a concentration of compression waves;

(a) At a focal region on the rearward, i.e. downstream, lip of the boundary layer bleed passage; or (b) At a focal region on a specially profiled surface at the forward, i.e. upstream, surface defining the bleed passage entry, to reflect expansion waves athwart the bleed passage; or (c) At the focal region on a specially profiled surface immediately rearward, i.e. downstream, of the bleed passage entry defining the commencement of the throat portion of the intake, the special profiling being such as to cancel and prevent reflection of the compression waves.

The concentration of compression waves may be achieved by bringing these waves to a focal point on an appropriate part of the intake or by causing them to converge so as to be intercepted by a small selected part of the intake.

According to a further feature of the invention means are provided to augment the cross sectional area of the boundary layer bleed passages available to fluid flow in response to a certain pressure rise at a region of the intake upstream of the throat so that spill can occur on movement of the normal shock into this region to maintain stable flow conditions. Such means may be provided by valves or the like controlling supplementary bleed passages, or by suitably profiling these passages to give a normal boundary layer bleed flow, under design operating conditions, together with a volume of stagnant air, the whole of the volume of the bleed passages being available to take spill flow (as well as the boundary layer bleed) upon upstream movement of the normal shock. In the latter case, the outlet from the bleed passage is desirably or perhaps necessarily provided with a valve device tending to restrict the outlet area.

According to a further feature of the invention, an air intake has its convergent portion of interrupted inflexion profile formed of a series of plane surfaces, or flats instead of the more usual smooth profile, the plane surfaces being disposed at varying angles to define the convergent portion with boundary layer bleed passages disposed at all, or at least some, of the intersection of the plane surfaces or flats. The design of the intake is such that series of compression waves given off by impingement of air on these surfaces are caused to converge towards a focal point or at a near-focal region on a selected part of the intake adjacent a main boundary bleed passage located in the vicinity of the throat. This convergence may be arranged to give any of the effects (a), (b), or (c) discussed above.

Intakes embodying the invention will now be described with reference to the accompanying drawings in which FIGURE 1 is a diagrammatic view showing a part of a convergent divergent intake for two dimensional flow which extends spanwise in planes normal to the plane of the paper;

FIGURE 5 shows diagrammatically a modified form of boundary layer bleed passage;

FIGURE 6 shows a modified form of a part of the intake shown in FIGURE 1;

FIGURE 7 shows diagrammatically a further modification of a boundary layer passage entry with a modified compression wave concentration;

FIGURE 8 shows diagrammatically a fragmentary view in cross-section through part of the convergent wall of the convergent-divergent intake, according to a still further modification;

Reference will first be made to the mechanism of formation of compression waves.

If a supersonic stream impinges on a surface inclined to the direction of flow, an oblique compression or shock wave is set up. Downstream of the wave, the flow velocity is lower than it is upstream of the wave (but it is still supersonic) and the pressure is increased, while the direction of flow is now parallel to the inclined surface. The obliquity of the compression wave and the reduction of the flow velocity and the increase of pressure across it depends upon the inclination of the surface and the initial velocity and pressure of the stream. The relationships of the various parameters are discussed in standard textbooks—see, for example, Aircraft and Missile Propulsion, vol. 1, pages 295–336, by M. J. Zucrow, published by John Wiley and Sons, Inc., 1958.

Now consider the case where the inclined surface is one wall of a duct, the surface of the other wall of which is parallel to the initial direction of flow. The oblique compression wave then extends from the forward edge of the inclined surface to a point of intersection with the other wall. Downstream of the wave the flow is parallel to the inclined surface but inclined to the other wall, and hence a second oblique compression wave (a "reflected" wave) is propagated from the point of intersection referred to, the obliquity however being different from that of the first wave due to the reduced flow velocity.

It will be appreciated that the formation of this second oblique compression wave can be avoided if the surface of the other wall downstream of the point of intersection is parallel to the flow downstream of the first compression wave and hence to the inclined surface forming the first-mentioned wall of the duct. Moreover it may then be possible to establish a normal shock wave, the characteristics of which are that the direction of flow is unchanged across the shock wave and the velocities upstream and downstream thereof are respectively supersonic and subsonic.

It should be noted further that if the surface of the other wall downstream of the point of intersection with first-mentioned compression wave is inclined away from the flow an expansion wave or expansion fan will be propagated from the point of intersection. There will be an increase of velocity and a reduction of pressure across the expansion wave or fan, this increase and the obliquity of the wave or fan depending on the inclination of the wall and the initial flow velocity.

Figure 1:
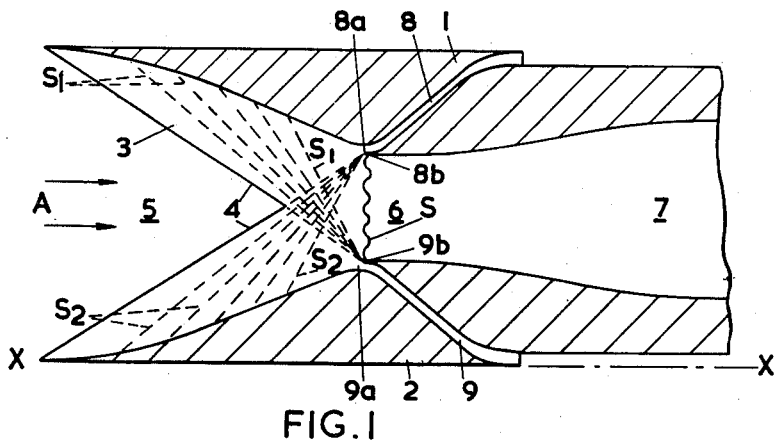

Referring now to FIGURE 1, a convergent-divergent intake designed for two dimensional supersonic flow has opposed walls 1 and 2, extending spanwise in planes normal to the drawing between walls located at the ends of the span, one end wall 3 only being shown. Each end wall, as at 3, is cut back in V formation at 4 to allow spillage at operation below optimum design conditions in conventional manner, and also to reduce boundary layer growth.

The opposed walls 1 and 2 have their adjacent faces profiled to provide a passage including a convergent portion 5, a throat portion 6 and a divergent portion 7 successively in the direction of the flow. The divergent passage 7 leads to the power plant (not shown). Boundary layer bleed means in the form of bleed passages 8, 9 are provided in the opposed walls 1, 2 respectively, whilst the end walls also have bleed passages but these have been omitted from the drawing for the sake of clarity.

As shown, the bleed passages 8 and 9 allow full boundary layer bleed immediately upstream of the throat 6 through bleed apertures or slots 8a, 9a and the downstream edges of these slots at 8b, 9b respectively are formed as upstream directed lips of acute profile.

The inclination of the profiled faces of the walls of the convergent portion 5 to the intake center line X—X and to the direction of the incoming flow indicated by arrow A increases progressively in the downstream direction and the shaping of the walls is such that in operation, when air is delivered into the intake at supersonic velocity, isentropic or multi-shock compression occurs and resultant weak compression waves $S_1$, $S_2$ are directed, as a fan pattern, so as to be brought directly to a focus on a focal line on the lips 8b, 9b. As will be seen from the drawing, weak compression waves $S_1$ derived from initial impingement of air on the profiled face of the wall 1 are brought to a focus at the lip 9b and weak compression waves $S_2$ from the profiled face of wall 2 are directed, as a fan pattern, directly to a focus at the lip 8b. The boundary layer flow along the profiled faces of these walls is bled off immediately upstream of these foci through bleed passages 8 and 9. Hence at the lips 8b, 9b the boundary layer is at minimum thickness, i.e. there may be no boundary layer or only a thin boundary layer and consequently little boundary layer interference with the compression at these foci, which represent lines where maximum compression can occur, arises.

At the throat 6 downstream from the lips 8b, 9b, the walls are parallel to the center line X—X to constrain the flow through the throat to be maintained parallel prior to diffusion in the divergent portion 7.

The change of direction of flow through the fan of compressor waves $S_1$ is indicated by the arrows $B_1$, $B_2$, $B_3$, $B_4$, $B_5$, while there is a similar but opposite change of direction of flow through compression waves $S_2$. Accordingly the flow adjacent the wall 1 downstream of the last of the waves $S_1$ undergoes a change of direction equal and opposite to the overall change of direction through the waves $S_1$ on passing through the fan of waves $S_2$ so that at the throat the flow is again axial and parallel to the center line as indicated by arrow C. In the center of the intake where the waves intersect the opposed components of flow cancel one another out so that an axial flow again results.

It is to be noted that the waves $S_1$, $S_2$ are themselves slightly deflected by their intersection with one another, but the departure from the straight line intersection shown is quite small.

It will be understood that although FIGURE 1 shows a specific cross section through the intake, any other section taken on any plane parallel to the plane of FIG- URE 1 would show similar focusing of the weak compression waves, $S_1$, $S_2$.

For optimum operating conditions, it is desirable to stabilize the normal shock wave S at the throat 6 or slightly downstream thereof. It is suggested that the minimum Mach number at which the shock wave S may be stabilized in the parallel throat 6 decreases as the upstream boundary layer thickness decreases. In the present invention, as there is virtually no boundary layer immediately upstream of the normal shock S in the throat 6, there is a likelihood that the normal shock might occur at a low Mach number thus minimizing shock losses and the possibility of boundary layer separation.

Under certain conditions of operation, there is a tendency for the normal shock wave S to move upstream into the convergent portion 5 of the intake. Such a tendency might occur for instance, where the intake feeds a ram jet combustion chamber which may give rise to pulsations in the intake due to turbulent combustion flow. As soon as the shock wave S moves upstream into the convergent portion 5, the flow conditions in the intake would probably become unstable and it is desirable to mitigate the effect of this upstream movement.

Figure 2:
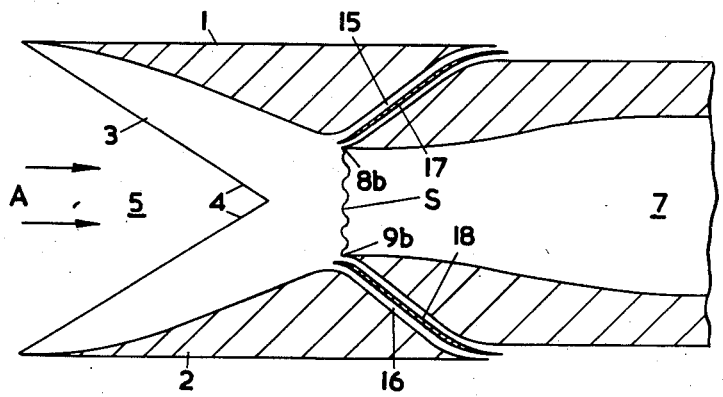
FIGURE 2 is a similar view to that of FIGURE 1 and shows a modification of the intake shown in that figure.

Accordingly, in FIGURE 2, a modified version of the arrangement of FIGURE 1 is shown which aims to prevent the onset of unstable conditions due to the aforementioned upstream shock wave movement. In FIGURE 2 similar parts are indicated by the same reference numerals as are used in FIGURE 1 and the parts are generally similar except that the bleed passages 8, 9 are formed as split bleed passages, so as to provide upstream boundary layer bleed passages 15, 16 in the walls 1, 2 respectively and adjacent shock wave spill passages 17, 18.

The effect of this split bleed is that whilst the boundary layer may be continuously bled off through passages 15, 16 any upstream movement of the normal shock wave S will cause this wave to extend over the entry of passages 17, 18 and to increase the flow in these passages and the shock position will be stabilised.

Before the upstream movement of the normal shock occurs, the Mach number at the passage entry is well above sonic speed because although the passage is located right at the throat entry, its entry is upstream of the focus of the compression waves $S_2$. As any passage carrying fluid at sonic speed is carrying its maximum possible mass flow, the upstream movement of the normal shock S in reducing the Mach number at the passage entry more nearly to sonic conditions is effective to increase the flow through spill passages 17, 18.

Figure 3:
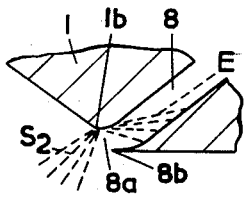
FIGURES 3, 4 and 4a show diagrammatically modifications to the boundary layer bleed passages shown in FIGURE 1 to achieve a zone of reducing pressure across the passage inlet and to facilitate the turning of the bleed flow into the passage.

FIGURE 3 shows a variation in the arrangement in FIGURE 1, in which the compression waves $S_1S_2$ arising from impingement of the oncoming air on the opposed walls 1, 2 are focussed on the wall upstream of the bleed passages. In FIGURE 3, which shows a cross-section of a part of the wall 1 shown in FIGURE 1 including the entry to the bleed passage 8 and a part of the passage itself, the compression waves $S_2$ are brought to a focus at a line 1b on the upstream lip of the bleed aperture 8a. Such a concentration of compression waves assists in turning the boundary layer flow from the direction indicated by arrows $B_5$ to the axial direction indicated by arrow $C_1$ and hence into the entry of the bleed passage. It also minimises the possibility of a detached shock wave forming when the boundary layer flow impinges on the lip 8b.

Figure 4:
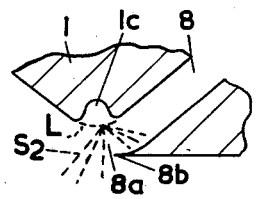

FIGURE 4 shows a further modification of FIGURE 1. In this figure, the bleed passage entry in the wall 1 is shown modified to provide an approximately constant static pressure region adjacent the boundary layer flow and allowing a short length of unrestrained boundary layer flow in order to achieve constant pressure. To give unrestrained flow at the entry slot 8a to the boundary layer bleed passage 8, the upstream lip of the passage is cut away to form a groove as shown in cross-section at 1c. The dotted line L in FIGURE 4 represents the free edge of the boundary layer bleed flow.

Figure 4A:
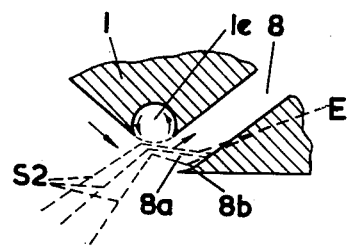

FIGURE 4a shows a modification of the entry slot 8a to the boundary layer bleed passage 8 shown in FIGURE 4, the groove 1e being made nearly circular so as to contain a rotating vortex of air, or so called vortex bearing, a part of the periphery of which forms part of a surface for leading the boundary layer flow around the corner between the convergent passage and the bleed passage.

In the embodiment of FIGURE 3, the surface of the upstream lip of slot 8a is shaped so that it curves away from the center line through an angle greater than the change in direction of flow due to passage of the air through the fan of compression waves $S_2$, as represented by arrows $B_5$ and $C_1$. This entails that a series of expansion waves, or an expansion fan, indicated at E, is set up athwart the entry to the boundary layer bleed passage 8. There is a resultant change of direction of flow—see arrow D—and a drop in pressure across these expansion waves which assists the boundary layer flow, counteracting the pressure rise across the compression waves $S_2$ and allowing for the fact that pressure must fall between the bleed passage entry and ambient atmosphere.

Similarly the formation of expansion waves E is shown in FIGURES 4 and 4a.

The features shown in FIGURES 4 or 4a could be incorporated in the arrangement shown in FIGURE 1 wherein the foci of compression waves $S_1S_2$, are on the downstream lips 9b, 8b respectively with the object of counteracting the shock in the boundary layer due to boundary layer flow impingement on lips 9b, 8b.

In a further modification of the arrangement shown in FIGURE 1, the bleed passages may be formed as shown in FIGURE 5 which shows diagrammatically a modified passage. As shown, the profiled face of the convergent wall 1 is cut back as at 1a to give a much enlarged bleed passage 8. Ordinarily, there will be no increase in the mass of the boundary layer bleed flow, the dotted line 20 representing the free stream line at the edge of the bleed flow, the remaining volume V of the passage 8 containing dead air at constant static pressure. A spring-restrained flap 21, hinged at 22 to an edge of the outlet of the passage 8, is spring biased in a sense to limit the area of the outlet so as to control automatically the spill flow and pressure level within the passage 8. Such an arrangement would contribute further to stabilising the normal shock, for on movement of the normal shock S forward from the throat 6, the enlarged area of the passage 8 is available for spillage.

It is probable that the arrangement would make the performance of the intake less sensitive to flight Mach number changes by allowing spill and preventing compression wave reflection when, at Mach numbers lower than those for which the intake is designed, the focal regions of these compression waves, $S_1S_2$ shown in FIGURE 1, move forward.

In all the designs, means are provided for starting the flow as in existing internal compression intakes. Such means include controllable spill ports in the convergent portion, V cut backs as at 4 (FIGURE 1) and having one of the walls (as at 1 or 2, FIGURE 1) translatable with respect to the other. It may also be desirable to arrange for the flexing of the walls 1 and 2 by forming them of flexible material to permit them to be varied in shape to help in starting or to maintain the foci of the weak compression waves in an acceptable region.

Although in the embodiments described above a two dimensional intake has been particularized, the invention is equally applicable to axisymmetric intakes of convergent-divergent configuration. One example of such an intake would comprise an annular, or other, axisymmetric, axially extending duct having a concentric centre body supported therein so as to define an annular intake duct of convergent-divergent form. The geometry of the convergent portion is similar to that of the two dimensional form shown in FIGURES 1 and 2. Such a construction may be visualized by considering the intake cross section shown in FIGURE 1 as being axisymmetric about an axis Y—Y with the wall 2 representing a half cross section through a centre body structure. Boundary layer bleed passage 9 would then lead to a duct extending axially along axis Y—Y so as to conduct away the boundary layer. To overcome difficulty of starting the axisymmetric embodiment, various devices may be incorporated, such as controllable spill ports or arranging for the centre body or a part of the centre body to be adjustable axially along axis Y—Y.

In one such arrangement with an axially adjustable centre body the walls of the throat portion may be profiled to lie on the walls of two imaginary cones whose apices are upstream of the intake and on the axis Y—Y, so that flow through the throat is divergent in a downstream direction with respect to axis Y—Y. Such a throat configuration (described below in its two dimension form with reference to FIGURE 6) requires that the relative geometry of the convergent walls be such that the fan of compression waves as at $S_2$ from the centre body is stronger than that, as at $S_1$, from the outer annular wall; i.e. the total pressure rise through the fan of compression waves $S_2$ is greater than that through the fan of waves $S_1$. Hence the centre body is made of larger diameter than it would otherwise be and is arranged to protrude upstream, whilst, of course maintaining the desirable characteristics of an internal compression intake. Both the aforementioned features assist spillage when the intake is operating under other than design conditions. Instead of split bleed passageways, separate passage may be provided for the boundary layer bleed and for shock wave spill. In this arrangement, it is possible to provide valves for the shock wave spill passages which are operated in response to upstream movement of the shock wave to open the spill passages. This valve arrangement could be applied to existing designs of internal compression intake in order to stabilize the normal shock.

An asymmetric version incorporating this arrangement is shown diagrammatically in FIGURE 6 which illustrates a two dimensional intake similar to that of FIGURE 1, but with the wall 2 protruding forwards, i.e. upstream, of the wall 1. The geometry of the profiled surface of the convergent walls 1, 2 is such as to give a similar concentration of the compression waves $S_1S_2$ as shown in FIGURE 1 but the throat portion 6 has its parallel wall surface $6a$, $6b$ aligned to define a throat, the centre line X—X, or centre plane, of which is at an inclination to the oncoming airstream A. The configuration of the remaining parts of the mutually facing walls $1^1$, $2^1$ (shown in part) is similar to that of the Busemann biplane.

It is also possible to adjust the direction of flow through the throat which is not inclined by smoothly curving the wall along the selected focal regions so that the resulting shock pattern is such as to give the required deviation of the flow direction.

In a further modification the arrangement in FIGURE 6 may apply to an intake for an aircraft giving virtually a double Busemann biplane effect with two outer walls as at 1 disposed on either side of a plane normal to the plane of the paper and containing the line Y—Y.

A further application of the invention is to an intake which is tapered in a spanwise direction, as for instance in a tapered wing Busemann biplane, with the walls 1, 2, tapering towards both ends of the span, i.e. towards the walls 3 at the ends of the span. The condition of the focusing of the compression waves $S_1S_2$ would still occur.

Although in the aforementioned embodiments of the invention the compression waves $S_1S_2$ have been described as being brought towards a focal point on the walls of the intake, the invention also extends to the case where these compression waves are caused to converge towards a small selected region, e.g. of the order of about 10% of the axial length of the convergent portion of the intake, yet not brought to a focus. In such circumstances an additional boundary layer bleed slot may be provided in the selected focal region.

Thus in a further modification shown in FIGURE 7, the concentration of pressure waves $S_1S_2$, of which waves $S_2$ only are shown, are not quite brought to a focus and are intercepted by a specially profiled portion defined by a curved profile at $8c$, extending between the downstream lip $8b$ of the inlet to boundary layer bleed passage 8 and the upstream end of the throat portion 6.

The inclination of the curved profile $8c$ to the intake center line decreases to zero in the downstream direction so as to prevent reflection of the compression waves $S_2$ and gives a smooth entry to the throat 6. The boundary layer would still be bled off immediately upstream of the near-focus on the curved profile $8c$ which profile would occupy as shown a small length of wall before the parallel throat 6. Such an arrangement should not be quite so sensitive to small changes in the configuration of the converging pressure waves as at $S_2$ but might give more difficulty in establishing a stable flow.

The arrangement shown in FIGURE 7 could equally be applied to that shown in FIGURE 3 insofar as the waves, e.g. at $S_2$, could be made to converge on a specially profiled portion at $1b$ which portion would be of such a shape as to give substantially constant, or decreasing, pressure along a streamline of the boundary line bleed flow.

Alternatively the arrangement of FIGURE 7 could be applied to the modification shown in FIGURES 4 or 4a the compression waves as at $S_2$ being brought to a near-focus on a small selected region of the lip $8b$ specially profiled as at $8c$ in FIGURE 7 whilst still preserving the static air region at $1c$ (FIGURE 4), or the vortex bearing (FIGURE 4a), as the case may be.

A further alternative resides in applying the near-focusing feature of the intercepted converging compression waves as at $S_2$ in FIGURE 7 to the structure as shown in FIGURE 4, the compression waves being brought to a near-focus on a free surface represented by the dotted line in FIGURE 4. By this means it is aimed to facilitate design and also to ensure that an appropriate constant, or decreasing static pressure condition obtains in the boundary layer at this region.

In a further alternative embodiment of the invention the convergent portion of the intake is designed to give laminar flow in the boundary layer. To this end, means may be provided for removing small proportions of the boundary layer at axially successive positions along the convergent walls as well as providing a boundary bleed at the throat.

This effect may be achieved by forming the convergent portion of the intake with smooth inflexed profile to give the compression wave pattern $S_1S_2$ as shown in FIGURE 1 of a porous material which provides a series of closely spaced air passages through which small proportions of the boundary layer is bled off. These bled off proportions are conducted through one or more suitable conduits and discharged rearwardly, probably at the rear of the aircraft, together with the boundary layer bled from the throat portion.

As an alternative to having the convergent walls 1, 2 of smoothly inflexed profile and formed of a porous material to effect boundary layer bleed, these walls may have a series of ports along the converging wall surfaces to provide a similar effect. One example of this is shown in FIGURE 8 which shows in cross-section a part of the wall 2 being one of the converging walls 1, 2.

As shown the wall 2 has its profiled face formed as a series of plane surfaces on flats $2a$, $2b$, $2c$ . . . each inclined at a successively increasing angle to the intake center line and disposed to give rise to a series of compression waves $S_2$ directed towards a focus at a position adjacent the boundary layer bleed slot at the throat. At each junction of the several flats $2a$, $2b$, $2c$, a small bleed passage 23a, 23b, 23c is provided to bleed off a small proportion of the boundary layer.

Any of the above described embodiments either alone, or where appropriate, in combination, may be applied to an aircraft propulsion unit intake, to a wing intake or to a wing intake from which a proportion of the air for combustion in a propulsion unit is taken.

Figure 9:
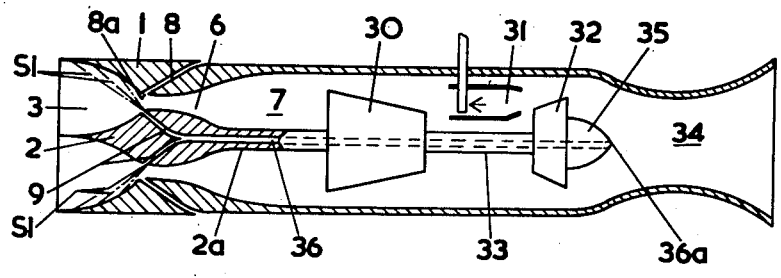
FIGURE 9 shows an axial cross section of a gas turbine jet propulsion engine having an intake embodying the invention.

FIGURE 9 shows an example of the intake of FIGURE 1 applied to a gas turbine jet propulsion engine. In FIGURE 9 the parts of the intake correspond to equivalent parts shown in FIG. 1 and are given the same reference numerals. Only the compression waves $S_1$ are shown in FIGURE 9, however, for the sake of clarity.

As shown the wall 1 of the intake is annular and extends rearwardly to form the outer engine casing and this defines an axially extending gas path for the air passing from the subsonic diffuser 7. Within the gas path are mounted an axial flow compressor 30, a combustion system 31 and an axial flow gas turbine 32 in driving connection with the compressor 30 through shaft 33. Downstream of the turbine 32 the outer casing defines a convergent-divergent jet propulsion nozzle 34.

The rotor of the compressor 30 is supported at its upstream end in bearings (not shown) in a rearward extension 2a of the centre body 2 whilst the downstream bearings for the turbine 32 are supported by centre bullet 35. As shown an axial bore 36 extends from the junction of bleed passage 9 through the centre body extension 2a, the rotor of the compressor 30, the shaft 33, the rotor of the turbine 32 and the centre bullet 35, terminating in a discharge port 36a located within the divergent portion of the nozzle 34. The boundary layer from the compression surface of the centre body 2 is bled off through bleed passages 9, upstream of focal region of compression waves $S_1$, through the bore 36 and discharged through port 36a. The boundary layer bleed from compression surfaces of the wall 1 are led through the wall 1 to atmosphere.

To facilitate starting and transonic operation of the intake a part of the wall 1 forward of the bleed passage 8 and the centre body 2, may be differentially translatable in a direction parallel to the axis of the engine in order to remove the internal contraction of flow entering the intake and to increase the throat area. The convergent configuration of the intake passage is thus eliminated by suitable profiling of the duct walls in relation to amount of axial translation imparted.

Under these conditions a further spill passage may be provided which extends from an inlet in the leading edge of the wall 1, within the duct wall, and discharges along a path substantially parallel to the direction of the passage 8.

I claim:

1. An intake for supersonic fluid flow comprising means defining a passage including, in the direction of flow, a convergent portion, a throat portion and a divergent portion, said passage in axial cross section having opposing walls disposed on opposite sides of a center line and converging in the direction of flow towards the center line with increasing inclination thereto to form said convergent portion and extending substantially parallel to the center line to form said throat portion, and further including lip means defining a bleed aperture in each opposing wall adjacent and upstream of said throat portion, wherein the shaping and inclination of each of the opposing walls of said convergent portion are such that a fan of compression waves resulting from impingement of supersonic fluid flow on each of said walls is directed towards a focal region adjacent the bleed aperture on its opposing wall.

2. A fluid intake according to claim 1 wherein the convergent portion is defined by a series of plane surfaces of the opposing walls, each plane surface in the axial direction of flow having increased inclination to the center line and being separated from adjacent plane surfaces by a bleed aperture.

3. An intake for supersonic fluid flow comprising means defining a passage including, in the direction of flow, a convergent portion, a throat portion and a divergent portion, said passage in axial cross-section having opposing walls disposed on opposite sides of a center line and converging in the direction of flow towards the center line with increasing inclination thereto to form said convergent portion and extending substantially parallel to the center line to form said throat portion, and further including lips in each of the opposing walls defining a bleed aperture, said lips including a downstream lip at the upstream end of said throat portion, wherein the shaping and inclination of each of the opposing walls of said convergent portion are such that a fan of compression waves resulting from impingement of supersonic fluid from on each of said walls is directed towards a focus on said downstream lip on its opposing wall.

4. An intake for supersonic fluid flow comprising means defining a passage including, in the direction of flow, a convergent portion, a throat portion and a divergent portion, said passage in axial cross-section having opposing walls disposed on opposite sides of a center line and converging in the direction of flows towards the center line with increasing inclination thereto to form said convergent portion and extending substantially parallel to the center line to form said throat portion, said passage further including lips in each of the opposing walls comprising an upstream lip and a downstream lip defining a bleed aperture, the downstream lip being adjacent to but spaced upstream from the upstream end of said throat portion, wherein each wall between the downstream lip and the upstream end of the throat portion includes in axial cross-section a curved profiled surface, the inclination of which in reference to the center line decreases to zero in the downstream direction, and wherein the shaping and inclination of each of the opposing walls of said convergent portion are such that a fan of compression waves resulting from impingement of supersonic fluid on each of said walls is directed towards a focal region extending over said profiled surface of its opposing wall, and each said profiled surface is shaped to prevent reflection of said compression waves focused thereon.

5. An intake for supersonic fluid flow comprising means defining a passage including, in the direction of flow, a convergent portion, a throat portion, and a divergent portion, said passage in axial cross-section having opposing walls disposed on opposite sides of a center line and converging in the direction of flow towards the center line with increasing inclination thereto to form said convergent portion and extending substantially parallel to the center line to form said throat portion, said passage further including lips in each of the opposing walls defining a bleed aperture adjacent and upstream of said throat portion, said lips including an upstream lip, wherein the shaping and inclination of each of the opposing walls of said convergent portion is such that a fan of compression waves resulting from impingement of supersonic fluid flow on each of said walls is directed towards a focal region on the upstream lip of the bleed aperture in its opposing wall.

6. An intake according to claim 5 wherein each said upstream lip has a surface which in axial cross section curves away from the center line through an angle greater resulting from impingement of supersonic fluid flow on compression waves focused thereon whereby expansion waves are set up across the bleed aperture.

7. An intake according to claim 5 wherein the surface of each said upstream lip is formed with a recess.

8. An intake according to claim 7 wherein each said recess is shaped to contain therein a vortex bearing.

References Cited in the file of this patent

UNITED STATES PATENTS 2,631,425     Nordfors _____ Mar. 17, 1953
2,811,828     McLafferty _____ Nov. 5, 1957

(Other references on following page)

| | | |
|---|---|---|
| 2,877,965 | Wakefield | Mar. 17, 1959 |
| 2,935,246 | Roy | May 3, 1960 |
| 2,947,139 | Hausmann | Aug. 2, 1960 |

FOREIGN PATENTS

| | | |
|---|---|---|
| 687,338 | Great Britain | Feb. 11, 1953 |
| 747,705 | Great Britain | Apr. 11, 1956 |
| 140,860 | Sweden | June 16, 1953 |

OTHER REFERENCES

Metzdorff: "Requirements, Parameters, And Design Considerations for Pneumatic Inlet Controls," paper presented at the SAE National Aeronautic Meeting, Los Angeles, Oct. 4, 1957, reprinted in vol. 66 of the "SAE Transactions 1958," pages 496–514, pages 498 and 499 relied on.